US012658475B2

(12) United States Patent
Li et al.

(10) Patent No.: US 12,658,475 B2
(45) Date of Patent: Jun. 16, 2026

(54) ELECTROLYTE AND LITHIUM ION BATTERY

(71) Applicant: SPRINGPOWER TECHNOLOGY (SHENZHEN) CO., LTD, Shenzhen (CN)

(72) Inventors: Feng Li, Shenzhen (CN); Changming Zhang, Shenzhen (CN); Pan Zhang, Shenzhen (CN); Miao Wang, Shenzhen (CN); Dalin Hu, Shenzhen (CN)

(73) Assignee: SPRINGPOWER TECHNOLOGY (SHENZHEN) CO., LTD, Shenzhen (CN)

( * ) Notice: Subject to any disclaimer, the term of this patent is extended or adjusted under 35 U.S.C. 154(b) by 607 days.

(21) Appl. No.: 18/131,506

(22) Filed: Apr. 6, 2023

(65) Prior Publication Data

US 2023/0246235 A1 Aug. 3, 2023

Related U.S. Application Data

(63) Continuation of application No. PCT/CN2021/100682, filed on Jun. 17, 2021.

(30) Foreign Application Priority Data

Jun. 17, 2020 (CN) .......................... 202010554801.8

(51) Int. Cl.
| | |
|---|---|
| *H01M 10/0567* | (2010.01) |
| *H01M 10/0525* | (2010.01) |
| *H01M 10/0569* | (2010.01) |

(52) U.S. Cl.
CPC ... *H01M 10/0567* (2013.01); *H01M 10/0525* (2013.01); *H01M 10/0569* (2013.01); *H01M 2300/004* (2013.01)

(58) Field of Classification Search
CPC ... H01M 10/0567–69; H01M 10/0525; H01M 2300/0034; H01M 2300/37; H01M 4/131; H01M 4/485; H01G 11/64
See application file for complete search history.

(56) References Cited

FOREIGN PATENT DOCUMENTS

| | | | |
|---|---|---|---|
| CN | 105449281 A | 3/2016 | |
| CN | 107394267 A | 11/2017 | |
| CN | 109461967 A | 3/2019 | |
| CN | 109659614 A | 4/2019 | |
| EP | 2571089 A1 * | 3/2013 | ........ H01M 10/0569 |
| JP | WO2019208246 A1 * | 1/2021 | ........ H01M 10/0525 |
| KR | 20190054920 A | 5/2019 | |
| WO | 2019220829 A1 | 11/2019 | |

OTHER PUBLICATIONS

Google translation of WO2019/208246 (Year: 2019).*
Translation of CN109461967.*
CN109037776 (Year: 2018).*
Google translation of CN109037776.*
International Search Report of PCT Patent Application No. PCT/CN2021/100682 issued on Aug. 20, 2021.
European Search Report of European Patent Application No. 21826481.0 issued on Feb. 8, 2024.

* cited by examiner

*Primary Examiner* — Jennifer Dieterle

(57) ABSTRACT

In order to overcome the problems of insufficient storage performance and cycle performance of existing lithium ion batteries, the present application provides an electrolyte, comprising a solvent, a lithium salt and an additive, wherein the additive comprises vinylene carbonate, 3,3'-[1,2-ethylenebis (oxy)]dipropionitrile and lithium difluoro (oxalate) borate, and a weight ratio of vinylene carbonate, 3,3'-[1,2-ethylenebis (oxy)]dipropionitrile and lithium difluoro (oxalate) borate is 1:0.2-6:0.01-5. Meanwhile, the application also discloses a lithium ion battery comprising the above electrolyte. The electrolyte provided by the present application can effectively improve the high-temperature storage performance and cycle performance of batteries.

14 Claims, No Drawings

ELECTROLYTE AND LITHIUM ION BATTERY

CROSS-REFERENCE TO RELATED APPLICATIONS

The present application is a continuation application of PCT application No. PCT/CN2021/100682 filed on Jun. 17, 2021, which claims the benefit of Chinese Patent Application No. 202010554801.8 filed on Jun. 17, 2020. The contents of all of the aforementioned applications are incorporated by reference herein in their entirety.

TECHNICAL FIELD

The application belongs to the technical field of secondary batteries, and particularly relates to an electrolyte and a lithium ion battery.

BACKGROUND

Lithium ion batteries are warmly favored by consumers because of their remarkable advantages such as high specific energy, high specific power, long cycle life and low self-discharge. They are widely used in portable electronic products such as mobile phones, digital cameras, personal computers and so on. At the same time, they have become an important choice in the field of power and energy storage, which is of great significance to the development of "low-carbon economy".

Lithium ion battery electrolyte is mainly composed of lithium salt and organic carbonate, and is the bridge between the positive and negative electrodes, and plays a role in transferring ions and conducting current in the battery. During the first charging and discharging process of lithium ion battery, the lithium salt, solvent and additive would undergo irreversible reduction reaction on the surface of carbon negative electrode to form a passivation film. And, 1,3-propane sultone (PS), as a film-forming additive with high cost performance, has been widely used in lithium ion electrolyte. However, 1,3-propane sultone has certain limitations as a film-forming additive. For example, on Dec. 17, 2015, the European Union added 1,3-propane sultone to the list of Substances of Very High Concern (SVHC), which shows that 1,3-propane sultone may have very serious or, in some cases, irreversible effects on people and the environment. Therefore, it is necessary to find a solution that can replace the existing 1,3-propane sultone as a high-performance electrolyte additive.

SUMMARY

Aiming at the problem that the existing lithium ion battery has insufficient storage performance and cycle performance, the present application provides an electrolyte and a lithium ion battery.

The technical solution adopted by the application to solve the above technical problem is as follows.

In one aspect, the application provides an electrolyte, including a solvent, a lithium salt and an additive, the additive includes vinylene carbonate, 3,3'-[1,2-ethylenebis (oxy)]dipropionitrile and lithium difluoro (oxalate) borate, and a weight ratio of vinylene carbonate, 3,3'-[1,2-ethylenebis (oxy)]dipropionitrile and lithium difluoro (oxalate) borate is 1:0.2-6:0.01-5.

Optionally, the electrolyte does not include 1,3-propane sultone.

Optionally, a percentage mass content of vinylene carbonate is 0.01%-10% based on a total mass of the electrolyte being 100%.

Optionally, the weight ratio of vinylene carbonate, 3,3'-[1,2-ethylenebis (oxy)]dipropionitrile and lithium difluoro (oxalate) borate is 1:0.5-4:0.02-3.

Optionally, the weight ratio of vinylene carbonate, 3,3'-[1,2-ethylenebis (oxy)]dipropionitrile and lithium difluoro (oxalate) borate is 1:1-3:0.05-2.

Optionally, the lithium salt is selected from one or more of organic lithium salt and inorganic lithium salt.

Optionally, the lithium salt includes one or more of hexafluorophosphate, hexafluoroarsenate, perchlorate, lithium trifluorosulfonyl, lithium difluoro (trifluoromethylsulfonyl) imide, lithium bis(fluorosulfonyl) imide and lithium tris (trifluoromethylsulfonyl) methyl.

Optionally, a concentration of the lithium salt in the electrolyte is 0.5%-2M.

Optionally, the solvent includes at least two of vinyl carbonate, propylene carbonate, dimethyl carbonate, diethyl carbonate, ethyl methyl carbonate, methyl formate, ethyl formate, ethyl propionate, propyl propionate, methyl butyrate and tetrahydrofuran.

In another aspect, the application provides a lithium ion battery, including a positive electrode, a negative electrode and the above-described electrolyte.

According to the electrolyte provided in the present application, vinylene carbonate, 3,3'-[1,2-ethylene bis (oxy)] dipropionitrile and lithium difluoro (oxalate) borateare added into the electrolyte in a specific proportion. These three substances have a synergistic effect on the electrolyte, which can decompose on the surfaces of the positive and negative electrodes to form a highly stable passivation film, effectively protect the positive and negative electrodes in the charging and discharging process of the battery, and can complex transition metal ions to avoid the formation of lithium dendrites and the separation of negative electrode material, thus effectively improving the high-temperature storage performance and cycle performance of the battery. And it is especially suitable for the use of high-voltage lithium ion batteries.

DETAILED DESCRIPTION OF THE DISCLOSED EMBODIMENTS

In order to make the technical solutions, beneficial effects and technical problems solved by the present application more clear, the application will be further illustrated in detail with embodiments below. It should be understood that the specific embodiments described here are only for explaining the application, not for limiting the application.

The application provides an electrolyte, including a solvent, a lithium salt and an additive, the additive includes vinylene carbonate, 3,3'-[1,2-ethylenebis (oxy)]dipropionitrile and lithium difluoro (oxalate) borate, and a weight ratio of vinylene carbonate, 3,3'-[1,2-ethylenebis (oxy)]dipropionitrile and lithium difluoro (oxalate) borate is 1:0.2-6:0.01-5.

The electrolyte is added with vinylene carbonate, 3,3'-[1, 2-ethylene bis (oxy)]dipropionitrile and lithium difluoro (oxalate) borateare added in a specific proportion. These three substances have a synergistic effect on the electrolyte, which can decompose on the surfaces of the positive and negative electrodes to form a highly stable passivation film, effectively protect the positive and negative electrodes in the charging and discharging process of the battery, and can complex transition metal ions to avoid the formation of lithium dendrites and the separation of negative electrode material, thus effectively improving the high-temperature storage performance and cycle performance of the battery. And it is especially suitable for the use of high-voltage lithium ion batteries.

In certain embodiments, the electrolyte does not include 1,3-propane sultone.

The present application solves the problems caused by 1,3-propane sultone by removing 1,3-propane sultone from the electrolyte. Meanwhile, by adopting the combination of vinylene carbonate, 3,3'-[1,2-ethylenebis (oxy)]dipropionitrile and lithium difluoro (oxalate) borate (in a specific proportion), the performance defects caused by the removal of 1,3-propane sultone can be effectively remedied, and the storage performance and cycle performance of lithium-ion battery would be able to reach a better level.

In a more preferred embodiment, the additive only includes vinylene carbonate, 3,3'-[1,2-ethylenebis (oxy)] dipropionitrile and lithium difluoro (oxalate) borate.

In certain embodiments, a percentage mass content of vinylene carbonate is 0.01%-10% based on a total mass of the electrolyte being 100%.

In a preferred embodiment, the percentage mass content of vinylene carbonate is 0.01%-4% based on the total mass of the electrolyte being 100%.

In a preferred embodiment, the weight ratio of vinylene carbonate, 3,3'-[1,2-ethylenebis (oxy)]dipropionitrile and lithium difluoro (oxalate) borate is 1:0.5-4:0.02-3.

In a more preferred embodiment, the weight ratio of vinylene carbonate, 3,3'-[1,2-ethylenebis (oxy)]dipropionitrile and lithium difluoro (oxalate) borate is 1:1-3:0.05-2.

In certain embodiments, the lithium salt is selected from one or more of organic lithium salt and inorganic lithium salt.

Specifically, the lithium salt includes one or more of hexafluorophosphate, hexafluoroarsenate, perchlorate, lithium trifluorosulfonyl, lithium difluoro (trifluoromethylsulfonyl) imide, lithium bis(fluorosulfonyl) imide and lithium tris (trifluoromethylsulfonyl) methyl.

It should be noted that in the present application, lithium difluoro (oxalate) borate is used as an additive, not as a lithium salt.

In a preferred embodiment, the lithium salt is selected from fluorine-containing lithium salts.

In certain embodiments, the concentration of the lithium salt in the electrolyte is 0.5%-2M.

In a preferred embodiment, the concentration of the lithium salt in the electrolyte is 0.9%-1.3M.

If the concentration of the lithium salt is too low, the conductivity of electrolyte would be low, which would affect the rate and cycle performance of the whole battery system. If the concentration of the lithium salt is too high, the viscosity of the electrolyte would be too high, which is also not conducive to the improvement of the rate of the whole battery system.

In certain embodiments, the solvent includes at least two of vinyl carbonate, propylene carbonate, dimethyl carbonate, diethyl carbonate, ethyl methyl carbonate, methyl formate, ethyl formate, ethyl propionate, propyl propionate, methyl butyrate and tetrahydrofuran.

Another embodiment of the present application provides a lithium ion battery, including a positive electrode, a negative electrode and the electrolyte as described above.

In certain embodiments, he positive electrode includes a positive electrode current collector and a positive electrode material, and the positive electrode material covers the positive electrode current collector to form a positive electrode material layer.

The positive electrode material includes a positive electrode active material, a positive electrode binder and a positive electrode conductive agent.

The positive electrode active material includes one or more of lithium cobalt oxide, nickel-cobalt-lithium-manganese ternary material, lithium iron phosphate and lithium manganate.

In a preferred embodiment, the positive electrode active material is selected from lithium cobalt oxide and nickel-cobalt-lithium-manganese ternary materia.

The charge upper limit voltage of the lithium ion battery is 4.5V.

The positive electrode conductive agent includes one or more of carbon black, acetylene black, conductive graphite, carbon nano tube and graphene.

The positive electrode binder includes one or more of styrene-butadiene rubber, polyacrylic acid, polyvinyl pyrrolidone, polyvinylidene fluoride and polytetrafluoroethylene.

In certain embodiments, the negative electrode includes a negative electrode current collector and a negative electrode material provided on the negative electrode current collector.

In certain embodiments, the compacted density of the negative electrode material is 1.6-1.85.

In a preferred embodiment, the compacted density of the negative electrode material is 1.75-1.85.

The negative electrode material includes a negative electrode active material, a negative electrode conductive agent and a negative electrode binder.

The negative active material includes one or more of carbon material, metal alloy, lithium-containing oxide and silicon-containing material.

In a preferred embodiment, the negative active material is selected from graphite.

The negative conductive agent includes one or more of carbon black, acetylene black, conductive graphite, carbon nano tube and graphene.

The negative electrode binder includes one or more of styrene-butadiene rubber, polyacrylic acid, polyvinyl pyrrolidone, polyvinylidene fluoride and polytetrafluoroethylene.

In certain embodiments, the lithium ion battery further includes a separator disposed between the positive electrode and the negative electrode.

With the non-aqueous electrolyte described above, the lithium ion battery provided by the embodiments of the application can effectively work with improved storage performance and cycle performance.

The application will be further illustrated by the following embodiments.

Embodiment 1

The embodiment is used to illustrate the electrolyte, lithium ion battery and its preparation method disclosed in this application, including the following steps.

Preparation of Electrolyte

Ethylene carbonate (EC), diethyl carbonate (DEC) and propylene carbonate (PC) were mixed in a mass ratio of 1:1:1 as an organic solvent. Additives of Embodiment 1 shown in Table 1 were added to the organic solvent and mixed evenly, then LiPF$_6$ was added, and an electrolyte with LiPF$_6$ concentration of 1.1 mol/L was obtained.

Preparation of Positive Electrode

The positive electrode active material lithium cobalt oxide (LiCoO$_2$), conductive agent carbon nano tube (CNT) and binder polyvinylidene fluoride were fully stirred and mixed in the solvent N-methyl pyrrolidone according to the mass ratio of 97:1.5:1.5 to form an uniform positive electrode slurry. The positive electrode slurry was uniformly coated on the positive electrode current collector Al foil, and then dried and cold pressed to obtain a positive electrode plate.

Preparation of Negative Electrode

The negative electrode active material graphite, conductive agent acetylene black, binder styrene-butadiene rubber and thickener sodium carboxymethyl cellulose were fully stirred and mixed in deionized water solvent according to the mass ratio of 95:2:2:1 to form an uniform negative electrode slurry. The slurry was coated on the negative electrode current collector Cu foil, then dried and cold pressed until the compacted density was 1.75, and a negative electrode plate was obtained.

Preparation of Lithium Ion Battery

PE porous polymer film is used as the separator film.

The positive electrode plate, separator film and negative electrode plate were stacked in sequence, so that the separator film was in the middle of the positive electrode plate and negative electrode plate, playing a separation role, and then a bare battery cell was obtained by winding. The bare battery cell was put into an outer packaging bag, then the electrolyte was injected into the dried cell, and after the

Embodiments 2-8

Embodiments 2-8 are used to illustrate the electrolyte, lithium ion battery and the preparation method disclosed in this application, including the steps of Embodiment 1, with the differences that:

additives corresponding to Embodiments 2-8 shown in Table 1 were used.

Comparative Examples 1-6

Comparative examples 1-6 are used to illustrate the electrolyte, lithium ion battery and the preparation method disclosed in this application, including the steps of Embodiment 1, with the differences that:

additives corresponding to Comparative examples 1-6 shown in Table 1 were used.

Performance Tests

The following performance tests were conducted on the electrolytes and batteries prepared from the above Embodiments 1-8 and Comparative examples 1-6.

Storage Performance Test

The batteries were full charged at room temperature, and the original thicknesses were recorded. Then the batteries were put in an oven at 60° C. for 21 days for the thickness test of battery at hot status.

Battery expansion rate (%)=(thickness of hot battery after 21 days−initial battery thickness)/initial battery thickness*100%

Cycle Performance Test

The batteries were put in an oven with a constant temperature of 25° C., and charged to 4.5V at 1C constant current and constant voltage, then discharged at 1C. The above was repeated for 300 cycles.

Capacity retention rate (%)=discharge capacity (mAh) of different cycles/discharge capacity (mAh) of the 300th cycle*100%

The test results are shown in Table 1.

TABLE 1

| | Percentage mass content (%) of each additive in the electrolyte | | | | Thickness | Capacity |
|---|---|---|---|---|---|---|
| Group | 1,3-propane sultone (PS) | vinylene carbonate (VC) | 3,3'-[1,2-ethylenebis (oxy)] dipropionitrile (DENE) | lithium difluoro (oxalate) borate (LiODFB ) | after storage for 21 days at 60° C. | of the 300th cycle |
| Embodiment 1 | 0 | 1 | 1 | 0.1 | 8.4 | 85.8 |
| Embodiment 2 | 0 | 1 | 1 | 1 | 4.3 | 90.1 |
| Embodiment 3 | 0 | 1 | 1 | 3 | 3.1 | 92 |
| Embodiment 4 | 0 | 2 | 1 | 0.1 | 5.7 | 88.8 |
| Embodiment 5 | 0 | 4 | 1 | 0.1 | 9.4 | 82.3 |
| Embodiment 6 | 0 | 1 | 2 | 0.1 | 1.4 | 93.4 |
| Embodiment 7 | 0 | 1 | 3 | 0.1 | 4.5 | 89 |
| Embodiment 8 | 3 | 1 | 2 | 0.1 | 1.2 | 93 |
| Comparative example 1 | 0 | 1 | 0 | 0 | 88 | 48 |
| Comparative example 2 | 0 | 0 | 1 | 0 | 86.3 | 46 |
| Comparative example 3 | 0 | 0 | 0 | 0.1 | 101 | 40 |
| Comparative example 4 | 0 | 1 | 1 | 0 | 75 | 57 |
| Comparative example 5 | 0 | 0 | 1 | 0.1 | 66 | 68.1 |
| Comparative example 6 | 0 | 1 | 0 | 0.1 | 72.3 | 58.2 | processes of vacuum packaging, standing, formation, shape-making and the like, the preparation of lithium ion battery was completed.

As can be seen from the test results in Table 1, compared with the combination of vinylene carbonate, 3,3'-[1,2-ethylene bis (oxy)]dipropionitrile and lithium difluoro (oxalate)

borate provided in this application, the electrolyte provided by the present application can significantly improve the high-temperature storage performance and cycle. Besides, the effects of the combined use of vinylene carbonate, 3,3'-[1,2-ethylenebis (oxy)]dipropionitrile and lithium difluoro (oxalate) borate are obviously better than that of the single use or combined use of two of them, which indicates that there is a clear synergistic effect among vinylene carbonate, 3,3'-[1,2-ethylenebis (oxy)]dipropionitrile and lithium difluoro (oxalate) borate.

Compared with the test results of Embodiments 1-7, the performance of battery provided by Embodiments 6 is the best. And the weight ratio of vinylene carbonate, 3,3'-[1,2-ethylenebis (oxy)]dipropionitrile and lithium difluoro (oxalate) borate is 1:2:0.1, indicating the combination of this three additives in this ratio is the best.

It can be seen from the test results of by comparing Embodiment 6 and Embodiment 8. PS is added on the basis of Embodiment 6 to obtain Embodiment 8. Compared with Embodiment 6 which is completely free of PS, the differences between the storage performance and cycle capacity of Embodiment 8 are small, which indicates that PS can be removed from preparation of the technical solutions provided by the application, and the lithium ion batteries prepared after the removal of PS also meet the requirements on high-temperature storage performance and cycle performance.

The above are only preferred embodiments of the present application, and not intended to limit the present application. Any modifications, equivalent substitutions and improvements made within the spirit and principle of the present application shall be included in the scope of protection of the present application. Further, the singular terms "a", "an" and "the" include plural reference and vice versa unless the context clearly indicates otherwise.

The invention claimed is:

1. An electrolyte, comprising a solvent, a lithium salt and an additive, wherein the additive comprises vinylene carbonate, 3,3'-[1,2-ethylenebis (oxy)]dipropionitrile and lithium difluoro (oxalate) borate, and a weight ratio of vinylene carbonate, 3,3'-[1,2-ethylenebis (oxy)]dipropionitrile and lithium difluoro (oxalate) borate is 1:1-3:0.05-2.

2. The electrolyte of claim 1, wherein the electrolyte does not comprise 1,3-propane sultone.

3. The electrolyte of claim 1, wherein a percentage mass content of vinylene carbonate is 0.01%-10% based on a total mass of the electrolyte being 100%.

4. The electrolyte of claim 1, wherein the lithium salt is selected from one or more of organic lithium salt and inorganic lithium salt.

5. The electrolyte of claim 4, wherein the lithium salt comprises one or more of hexafluorophosphate, hexafluoroarsenate, perchlorate, lithium trifluorosulfonyl, lithium difluoro (trifluoromethylsulfonyl) imide, lithium bis (fluorosulfonyl) imide and lithium tris (trifluoromethylsulfonyl) methyl.

6. The electrolyte of claim 1, wherein a concentration of the lithium salt in the electrolyte is 0.5%-2M.

7. The electrolyte of claim 1, wherein the solvent comprises at least two of vinyl carbonate, propylene carbonate, dimethyl carbonate, diethyl carbonate, ethyl methyl carbonate, methyl formate, ethyl formate, ethyl propionate, propyl propionate, methyl butyrate and tetrahydrofuran.

8. A lithium ion battery, comprising a positive electrode, a negative electrode and the electrolyte of claim 1.

9. A lithium ion battery, comprising a positive electrode, a negative electrode and the electrolyte of claim 2.

10. A lithium ion battery, comprising a positive electrode, a negative electrode and the electrolyte of claim 3.

11. A lithium ion battery, comprising a positive electrode, a negative electrode and the electrolyte of claim 4.

12. A lithium ion battery, comprising a positive electrode, a negative electrode and the electrolyte of claim 5.

13. A lithium ion battery, comprising a positive electrode, a negative electrode and the electrolyte of claim 6.

14. A lithium ion battery, comprising a positive electrode, a negative electrode and the electrolyte of claim 7.

* * * * *